US012784522B2

(12) United States Patent
Murphy et al.

(10) Patent No.: US 12,784,522 B2
(45) Date of Patent: Nov. 3, 2026

(54) SYSTEM FOR REMOTE RETRIEVAL AND INSERTION OF CONTENTS WITHIN INDIVIDUALLY SECURED CONTAINERS

(71) Applicant: BANK OF AMERICA CORPORATION, Charlotte, NC (US)

(72) Inventors: Timothy Scott Murphy, Charlotte, NC (US); Paul Martin Mattison, Sherrills Ford, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 448 days.

(21) Appl. No.: 18/373,473

(22) Filed: Sep. 27, 2023

(65) Prior Publication Data

US 2025/0104498 A1 Mar. 27, 2025

(51) Int. Cl.
*G07C 9/32* (2020.01)
*B65G 1/137* (2006.01)
(Continued)

(52) U.S. Cl.
CPC ....... *G07C 9/00912* (2013.01); *B65G 1/1371* (2013.01); *B65G 1/1373* (2013.01); *G07C 9/32* (2020.01); *B65G 2203/041* (2013.01)

(58) Field of Classification Search
CPC ............ G07C 9/00309; G07C 9/00571; G07C 9/00896; G07C 9/00182; G07C 2009/00412; G07C 9/00912; G07C 9/215; G07C 9/28; G07C 9/00174; G07C 9/0069; G07C 2009/00793; G07C 9/29; G07C 2009/00769; G07C 2009/0092; G07C 2209/63; G07C 2009/00825;
(Continued)

(56) References Cited

U.S. PATENT DOCUMENTS

| | | | | |
|---|---|---|---|---|
| 11,010,903 B1 * | 5/2021 | Gallaudet | .............. | G06V 20/46 |
| 2023/0159286 A1 * | 5/2023 | Schler | ....................... | E05G 7/00 414/389 |

(Continued)

FOREIGN PATENT DOCUMENTS

| | | |
|---|---|---|
| CN | 112660682 | 4/2021 |
| CN | 114863591 | 8/2022 |
| CN | 219197063 | 6/2023 |

*Primary Examiner* — Dionne Pendleton
(74) *Attorney, Agent, or Firm* — Moore & Van Allen PLLC; Nicholas C. Russell

(57) ABSTRACT

Remote access to secured containers is provided by a user interface apparatus having an associated receptacle for receiving physical items delivered from and to the remote secured container. Delivery of the physical items to and from the user interface device's receptacle and the secure container may be accomplished by a robotic mechanism or the like. The user of the remote secured container access system pre-registers, such that presentation of the user credentials at the user interface apparatus provides the user options for receiving items for the secured container and delivering items. Moreover, the user credentials are associated with a secure container identifier and access credentials for gaining access to the secured area and/or the secured container, such that presentation of the user credentials provides identification of the secure container and access to the secured area and/or the secured container.

18 Claims, 12 Drawing Sheets

(51) Int. Cl.
*G06Q 10/087* (2023.01)
*G07C 9/00* (2020.01)

(58) Field of Classification Search
CPC ...... G07C 2009/00841; G07C 2209/08; G07C 2209/62; G07C 9/00817; G07C 9/23; G07C 9/27; G07C 2009/00753; G07C 2009/00865; G07C 2009/0088; G07C 2009/00936; G07C 2009/00984; G07C 9/00857; G07C 9/33; G07C 2009/00253; G07C 2009/00507; G07C 2009/00603; G07C 2009/00761; G07C 2009/00849; G07C 2209/10; G07C 2209/61; G07C 9/00563; G07C 9/00674; G07C 9/00944; G07C 9/21; G07C 2009/00301; G07C 2009/00388; G07C 2009/00555; G07C 2009/00928; G07C 2209/65; G07C 9/00738; G07C 9/00904; G07C 9/20; G07C 9/25; G07C 9/32; G07C 25/008; G07C 13/149; G07C 13/2402; G07C 21/24; G07C 19/4155; G07C 2219/37431; G07C 2209/80; G07C 9/3226; G07C 9/3242; G07C 2209/24; G07C 2209/805; G07C 63/062; G07C 67/125; G07C 9/14; G07C 9/30; G07C 2463/121; G07C 63/067; G07C 63/08; G07C 63/0823; G07C 63/0838; G07C 63/0869; G07C 63/10; G07C 63/20; G07C 63/205; G07C 9/10; G07C 2009/00452; G07C 2009/00468; G07C 2209/04; G07C 9/00735; G07C 9/257; G07C 9/37; E05B 19/0005; E05B 39/005; E05B 47/0001; E05B 2045/067; E05B 2047/0058; E05B 2047/0067; E05B 45/06; E05B 47/0004; E05B 47/0603; E05B 65/0075; E05B 83/10; E05B 2047/0068; E05B 2047/0095; E05B 41/00; E05B 47/0046; E05B 47/026; H04W 12/041; H04W 4/80; H04W 12/04; H04W 12/069; H04W 12/50; H04W 12/61; H04W 12/71; H04W 12/72; H04W 4/023; H04W 4/38; H04W 4/70; H04W 12/06; H04W 12/63; H04W 12/08; H04W 4/029; H04W 4/44; H04W 88/02; A47G 2029/145; A47G 29/141; A47G 2029/147; A47G 2029/149; B65D 2203/10; B65D 2211/00; B65D 90/00; B65D 50/00; E05C 19/186; E05G 1/04; E05G 1/10; G06K 7/10227; G06K 21/6209; G06K 21/77; G06K 2221/2101; G06K 2221/2105; G06K 2221/2111; G06K 2221/2117; G06K 2221/2149; G06K 21/31; G06K 21/45; G06K 21/62; G06K 21/78; G06Q 20/327; G06Q 10/0836; G06Q 10/0837; G06Q 20/04; G06Q 30/0185; G06Q 30/0601; G06Q 30/0603; G06Q 30/0627; G06Q 50/265; G06Q 10/0832; G06Q 10/0833; G06Q 50/40; G06Q 20/18; G06Q 10/00; G06Q 10/08; G06Q 10/08355; G06Q 10/0838; G06Q 20/127; G06Q 20/145; G06Q 20/3224; G06Q 2220/10; H04M 1/72415; H04M 1/72469; G07F 17/13; G07F 5/18; G07F 7/02; G07F 9/001; G07F 9/002; G07F 9/026; G07F 17/12; G07F 7/06; G07F 7/12; Y10T 70/7068; Y10T 70/7062; B25J 13/06; B60R 25/245; B60R 25/246; B60R 25/1012; B60R 2325/205; B60R 25/241; G01S 19/39; G07B 2017/00225; G07B 15/04; B65G 1/137; B65G 67/24; B65G 1/1371; B65G 1/1373; B65G 2203/041; E05F 15/73; E05F 15/77; E05F 7/00; E05Y 2400/45; E05Y 2400/66; E05Y 2400/85; E05Y 2999/00; G05B 13/0265; G05B 19/4155; G05B 2219/37431; G06T 2207/10016; G06T 2207/20076; G06T 7/20; G06V 20/41; G06V 20/46; G06V 20/52; G06V 30/19173; G06V 30/424; G06V 40/20; H04L 63/083; H04L 63/1408; H04L 2209/80; H04L 9/3226; H04L 9/3242; H04L 9/14; H04L 9/30; H04L 2209/24; H04L 2209/805; H04L 2209/84; H04L 63/062; H04L 63/20; H04L 63/045; H04L 63/0492; H04L 63/06; H04L 63/08; H04L 63/0807; H04L 63/0869; H04L 63/10; H04L 9/006; H04L 9/0643; H04L 9/0819; H04L 9/0838; H04L 9/0861; H04L 9/0866; H04L 9/088; H04L 9/0891; H04L 9/0894; H04L 9/32; H04L 9/3247; H04N 23/90; H04N 23/951; H04R 3/04; G16H 20/10; G16H 40/63; B66B 1/34; B66B 1/468; B66B 2201/4615; B66B 2201/4623; B66B 2201/4646; B66B 2201/4653; B66B 2201/4661; B66B 2201/4676; B66B 5/0012; G06F 21/62; G06F 21/6209; G06F 21/77; G06F 2221/2101; G06F 2221/2105; G06F 2221/2111; G06F 2221/2117; G06F 2221/2149; G06F 21/31; G06F 21/335; G06F 21/35; G06F 2221/2147; G08B 25/008; G08B 13/149; G08B 13/2402; G08B 21/24; G08B 26/007; G08B 26/008; G08B 27/001; G08B 3/10
See application file for complete search history.

(56) References Cited

U.S. PATENT DOCUMENTS

| | | | | |
|---|---|---|---|---|
| 2024/0054833 | A1* | 2/2024 | Hilaire | H04L 63/083 |
| 2024/0242170 | A1* | 7/2024 | Bergmann | G06Q 10/0836 |
| 2025/0118124 | A1* | 4/2025 | Levy | G06K 7/1413 |

* cited by examiner

SYSTEM FOR REMOTE RETRIEVAL AND INSERTION OF CONTENTS WITHIN INDIVIDUALLY SECURED CONTAINERS

FIELD OF THE INVENTION

The present invention is related generally to secured storage of physical items and, more specifically, remote retrieval and insertion/deposit of physical items from and to a user-specific secured container.

BACKGROUND

Secure storage of items is typically provided by secured containers, such as safe deposit boxes located within a secure area, such as a vaulted area of a financial institution. Such safety deposit boxes provide challenges from both the user (i.e., safety deposit box holder) and the provider (i.e., financial institution or the like) perspective. From the user perspective, since access to the safe deposit requires entry into a vaulted area, in most instances the user is required to make an appointment in order to access their safety deposit box. However, appointment requirements may not be advantageous to the user's time constraints, if they desire to immediately retrieve items from or add items to the safe deposit box. From the provider perspective, undesirable overhead costs are associated with maintaining safety deposit boxes in vaulted areas, such as manpower requires to check-in the user prior to vault entry as well as manpower to open the vault and, in some instances, accompany or assist the user inside the vaulted area with safe deposit box entry. Moreover, in certain instances the space within a vaulted area allocated to safety deposit boxes must be maintained to allow for user access.

Therefore, a need exists to allow for users to remotely access secure containers, such as safe deposit boxes or the like. In desired instances the remote access should self-service remote access, which allows for the user to retrieve items from the secure container/safe deposit box or place items into the secure container/safe deposit absent assistance by the secure container provider or other entity providing the secure area at which the secure container/safe deposit box is located. Moreover, the desired remote access should provide a certain level of privacy such that the user can retrieve items from the secure container/safe deposit box or place items into the secure container/safe deposit without other individuals being aware of the items being retrieved from or placed into the secured container/safe deposit box.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program products and the like provide for remote access to secured containers, such as safe deposit boxes or the like. Remote access is made possible by a user interface apparatus, such as an Automated Teller Machine (ATM) or dedicated kiosk device which has an associated receptacle for receiving physical items delivered from and to the remote secured container, such as a safety deposit box.

The user of the remote secured container access system pre-registers, such that presentation of the user credentials at the user interface apparatus provides the user options for receiving items for the secured container and delivering items. Moreover, the user credentials are associated with a secure container identifier (i.e., safety deposit box number) and access credentials for gaining access to the secured area (e.g., vaulted area, warehouse or the like) and/or the secured container.

According to specific embodiments of the present invention, delivery of the physical items to and from the user interface device's receptacle and the secure container is accomplished by a robotic mechanism, which may be guided on a rail system or otherwise an autonomous robotic mechanism that can navigate between the receptacle and the secured container. The robotics mechanism includes an image-capturing device which is used to capture images of physical items as they are delivered to the secure container, to allow for cataloging the physical items according to their images and user assigned identifier/name. In this regard, when a user desires to retrieve a specific item from the secure container, the image capturing device scans the contents of the secure container and image recognition techniques are used to identify the physical item whose image matches the identifier/name of the item as provided by the user.

In specific embodiments of the invention, privacy is provided to the user at the user interface device is provided by a display utilizing privacy glass. Specifically, in response to the user selecting delivery of items to or from the secured container, the privacy glass is invoked to change the transparency or opacity of the display, thereby creating a secure/private region proximate to the user interface apparatus.

A system for remote retrieval and insertion of contents from/within user-specific secured containers defines first embodiments of the invention. The system includes a user interface apparatus, which in specific embodiments of the system, may comprise an Automated Teller Machine (ATM), a stand-alone kiosk or another such apparatus. The user interface apparatus includes a receptacle configured to (i) receive first physical items from a user for storage in a user-specific secured container, and (ii) deliver second physical items to the user that have been retrieved from the user-specific secured container. The user-specific secured container is located in a secured area that is co-located with the user interface apparatus. In specific embodiments of the system, the user-specific secured container is a safe/safety deposit box and the secured area is a vaulted area, such as a financial institution vault. In other embodiments of the system, the secured area is a secured warehouse and the secured container is a bin or some other conventional container. In such embodiments of the system, the user interface apparatus, which may comprise an ATM or kiosk is co-located at the vaulted area, such as at the financial institution or at the secure warehouse or the like.

The user interface apparatus includes a first computing platform having a first memory, one or more first computing device processors in communication with the first memory and a display in communication with at least one of the one or more computing processor devices. The memory of first computing platform stores a user interface application that is configured to receive, from a user, user credentials (e.g., passcode, personal data or the like) that are associated with (i) an identifier (e.g., a number or the like) of the user-specific secured container, and (ii) security credentials (e.g., passcode or other means for "unlocking") for accessing at least one of (a) the secured area and (b) the user-specific secured container. In response to receiving the user credentials, user interface application validates the user credentials to authenticate the user and verify that the user is associated with a user-specific secured container.

In response to validating the user credentials, the user interface application is configured to provide, via the display, user interfaces configured to allow the user to perform at least one (i) add one or more first physical items to the user-specific secured container by placing the one or more first physical items in the receptacle, and (ii) receive, via the receptacle, delivery of one or more second physical items from the user-specific secured container. In this regard, the user interfaces provide the user options for adding physical items (e.g., valuables, documents or the like) to the to the user-specific secured container by placing the one or more first physical items in the receptacle through placement of the physical items in the receptacle and receiving delivery, via the receptacle, of physical items currently stored user-specific secured container In specific embodiments the system further comprises a robotic mechanism including a second computing platform having a second memory and one or more second computing device processors in communication with the second memory. The second memory of second computing platform stores physical item retrieval and delivery engine that is configured to receive (i) the identifier of the user-specific secured container, and (ii) the security credentials, and (1) based on the security credentials, provide access to at least one of (a) the secured area, and (b) the user-specific secured container, and (2) based on the identifier of the user-specific secured container, implement the robotics mechanism to remove from the receptacle one or more first physical items and deliver the one or more first physical items to the user-specific secured container.

In further related embodiments of the system, the user interface application is further configured to receive a first user input that comprises a first identifier (e.g., a name or the like) for each of the one or more first physical items being added to the user-specific secure container and the item retrieval and delivery engine is further configured to receive the first identifiers for each of the one or more first physical items. In such embodiments of the system, the robotics mechanism includes an image capturing device that is configured to capture one or more images of each of the one or more first physical items and store the one or more images in a database that catalogs the one or more images according to the first identifier of a corresponding first physical item.

In other related embodiments of the system, the physical item retrieval and delivery engine is further configured to receive (iii) via the user interface application user instructions to configured to retrieve (a) at least a portion of the user-specific secured container (e.g., entire container or a specific section/compartment of the container) or (b) one or more specified second physical items from the user-specific secured container. Based on the identifier of the user-specific secured container, the implement the robotics mechanism to retrieve (a) the at least a portion of the user-specific secured container or (b) the one or more specified second physical items from the user-specific secured container and deliver (a) or (b) to the receptacle.

In further related embodiments of the system, user interface application is further configured to receive a second user input that comprises a second identifier (e.g., name or the like) for each of the one or more second physical items being retrieved from the user-specific secure container. In such embodiments of the system, the item retrieval and delivery engine is further configured to access the database to determine whether at least one of the second identifiers matches one of the first identifiers, and, in response to determining that at least one of the second identifiers matches one of the first identifiers, instruct the image capturing device to scan the contents of the user-specific secure container and implement image recognition techniques on the scanned contents to identify at least one second physical item based on the scanned contents including the cataloged image associated with the matching first identifier. In such embodiments of the system, the robotics mechanism is further configured to retrieve the identified at least one second physical item from the user-specific secure container and deliver the identified at least one second physical item to the receptacle.

In further related embodiments of the system, in which the item retrieval and delivery engine does not determine a match between the second identifier(s) and the first identifier(s), the item retrieval and delivery engine is configured to compile the captured images of the first physical items stored in the user-specific secure container (i.e., images of all the items currently stored in the container) and communicate the captured images to the user interface application. In such embodiments of the system, the user interface application is configured to provide, via the display, one or more user interfaces configured to display the captured images and allow the user to select one or more captured images to initiate the retrieval from the user-specific secure container of the physically items depicted in the selected one or more captured images. In other related embodiments of the system, in which the item retrieval and delivery engine does not determine a match between the second identifier(s) and the first identifier(s), the item retrieval and delivery engine is configured to implement Artificial Intelligence (AI) (e.g., Machine Learning (ML) techniques or the like) to determine first identifiers (e.g., names ort the like) that are similar to the second identifier (e.g., name or the like), compile the captured images associated with such first identifiers and communicate the captured images to the user interface application. In such embodiments of the system, the user interface application is configured to provide, via the display, one or more user interfaces configured to display the captured images and allow the user to select one or more captured images to initiate the retrieval from the user-specific secure container of the physically items depicted in the selected one or more captured images.

In other specific embodiments of the system, the display of the user interface apparatus comprises privacy glass. In such embodiments of the system, the user interface application is further configured to receive a user input that indicates a user selection of (i) adding the one or more first physical items to the user-specific secured container, or (ii) receiving delivery of the one or more second physical items from the user-specific secured container. In response to receiving the user input, the user interface application is configured to implement the privacy glass to change at least one of a transparency or opacity of the display to generate a security region proximate the user interface apparatus.

A computer-implemented method for retrieval and insertion of contents from/within user-specific secured containers defines second embodiments of the invention. The method being executable by one or more computing processor devices. The method includes receiving from a user at a user interface apparatus, user credentials that are associated with (i) an identifier of a user-specific secured container, and (ii)

security credentials for accessing at least one of (a) a secured area in which the user-specific secured container is located, and (b) the user-specific secured container. In response to receiving the user credentials, the method includes validating the user credentials to authenticate the user and verify that the user is associated with a user-specific secured container. In response to validating the user credentials, the method further includes providing, via the display, user interfaces configured to allow the user to perform at least one of (i) adding one or more first physical items to the user-specific secured container through placement of the one or more first physical items in a receptacle included in the user interface apparatus, and (ii) receiving, via the receptacle, delivery of one or more second physical items from the user-specific secured container.

In specific embodiments the computer-implemented method further includes based on the security credentials, providing access to at least one of (a) the secured area, and (b) the user-specific secured container, and based on the identifier of the user-specific secured container, implementing a robotics mechanism to remove from the receptacle one or more first physical items and deliver the one or more first physical items to the user-specific secured container. In related embodiments the computer-implemented method further includes receiving, at the user interface apparatus, a first user input that comprises a first identifier for each of the one or more first physical items being added to the user-specific secure container, capturing, via an image-capturing device in communication with the robotics mechanism, one or more images of each of the one or more first physical items to be added to the user-specific secure container; and storing the one or more images in a database according to the first identifier of a corresponding first physical item.

In further specific embodiments the computer-implemented method includes receiving, at the user interface apparatus, user instructions to retrieve (a) at least a portion of the user-specific secured container or (b) one or more specified second physical items from the user-specific secured container, and based on the security credentials, providing access to at least one of (a) the secured area, and (b) the user-specific secured container, and based on the identifier, implementing a robotics mechanism to retrieve (a) the at least a portion of the user-specific secured container or (b) the one or more specified second physical items from the user-specific secured container and deliver (a) or (b) to the receptacle. In related embodiments the computer-implemented method includes receiving, at the user interface apparatus, a second user input that comprises a second identifier for each of the one or more second physical items being retrieved from the user-specific secure container, accessing the database to determine whether at least one of the second identifiers matches one of the first identifiers. In response to determining that at least one of the second identifiers matches one of the first identifiers, the method further includes instructing the image capturing device to scan the contents of the user-specific secure container and implementing image recognition techniques on the scanned contents to identify at least one second physical item based on the scanned contents including the cataloged image associated with the matching first identifier. Further, the method includes retrieving, via the robotics mechanism, the identified at least one second physical item from the user-specific secure container and delivering, via the robotics mechanism, the identified at least one second physical item to the receptacle.

A computer program product including a non-transitory computer-readable medium defines third embodiments of the invention. The computer-readable medium includes sets of codes for causing one or more computing devices to receive, from a user at a user interface apparatus, user credentials that are associated with (i) an identifier of a user-specific secured container, and (ii) security credentials for accessing at least one of (a) a secured area in which the user-specific secured container is located, and (b) the user-specific secured container. Further, the sets of codes sets of codes cause one or more computing devices to validate the user credentials to authenticate the user, and in response to validating the user credentials, provide, via the display, user interfaces configured to allow the user to perform at least one of (i) adding one or more first physical items to the user-specific secured container through placement of the one or more first physical items in a receptacle included in the user interface apparatus, and (ii) receiving, via the receptacle, delivery of one or more second physical items from the user-specific secured container.

In specific embodiments of the computer program products, the sets of codes further cause the one or more computing devices to, based on the security credentials, provide access to at least one of (a) the secured area, and (b) the user-specific secured container, and based on the identifier of the user-specific secured container, implement a robotics mechanism to remove from the receptacle one or more first physical items and deliver the one or more first physical items to the user-specific secured container. In related embodiments of the computer program product, the sets of codes further cause the one or more computing devices to receive, at the user interface apparatus, a first user input that comprises a first identifier for each of the one or more first physical items being added to the user-specific secure container, capture, via an image-capturing device in communication with the robotics mechanism, one or more images of each of the one or more first physical items to be added to the user-specific secure container, and store the one or more images in a database according to the first identifier of a corresponding first physical item.

In other specific embodiments of the computer program products, the sets of codes further cause the one or more computing devices to receive, at the user interface apparatus, user instructions to retrieve (a) at least a portion of the user-specific secured container or (b) one or more specified second physical items from the user-specific secured container. Further, the sets of codes cause the one or more computing devices to, based on the security credentials, provide access to at least one of (a) the secured area, and (b) the user-specific secured container; and based on the identifier, implement a robotics mechanism to retrieve (a) the at least a portion of the user-specific secured container or (b) the one or more specified second physical items from the user-specific secured container and deliver (a) or (b) to the receptacle. In related embodiments of the computer program product, the sets of codes further cause the one or more computing devices to receive, at the user interface apparatus, a second user input that comprises a second identifier for each of the one or more second physical items being retrieved from the user-specific secure container and access the database to determine whether at least one of the second identifiers matches one of the first identifiers. In response to determining that at least one of the second identifiers matches one of the first identifiers, the sets of codes further cause the computing device(s) to instruct the image capturing device to scan the contents of the user-specific secure container, implement image recognition techniques on the scanned contents to identify at least one second physical item based on the scanned contents including the cataloged image associated with the matching first identifier and retrieve, via the robotics mechanism, the identified at least one second physical item from the user-specific secure container and delivering, via the robotics mechanism, the identified at least one second physical item to the receptacle.

Thus, according to embodiments of the invention, which will be discussed in greater detail below, the present invention provides for remote access to secured containers, such as safe deposit boxes or the like. Remote access is made possible by a user interface apparatus, such as an Automated Teller Machine (ATM) or dedicated kiosk device which has an associated receptacle for receiving physical items delivered from and to the remote secured container, such as a safety deposit box. In specific embodiments of the invention, delivery of the physical items to and from the user interface device's receptacle and the secure container is accomplished by a robotic mechanism, which may be guided on a rail system or otherwise an autonomous robotic mechanism that can navigate between the receptacle and the secured container. The user of the remote secured container access system pre-registers, such that presentation of the user credentials at the user interface apparatus provides the user options for receiving items for the secured container and delivering items. Moreover, the user credentials are associated with a secure container identifier (i.e., safety deposit box number) and access credentials for gaining access to the secured area (e.g., vaulted area, warehouse or the like) and/or the secured container. Thus, presentation of the user credentials provides for identification of the secured container and access to the secured area and/or secured container.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
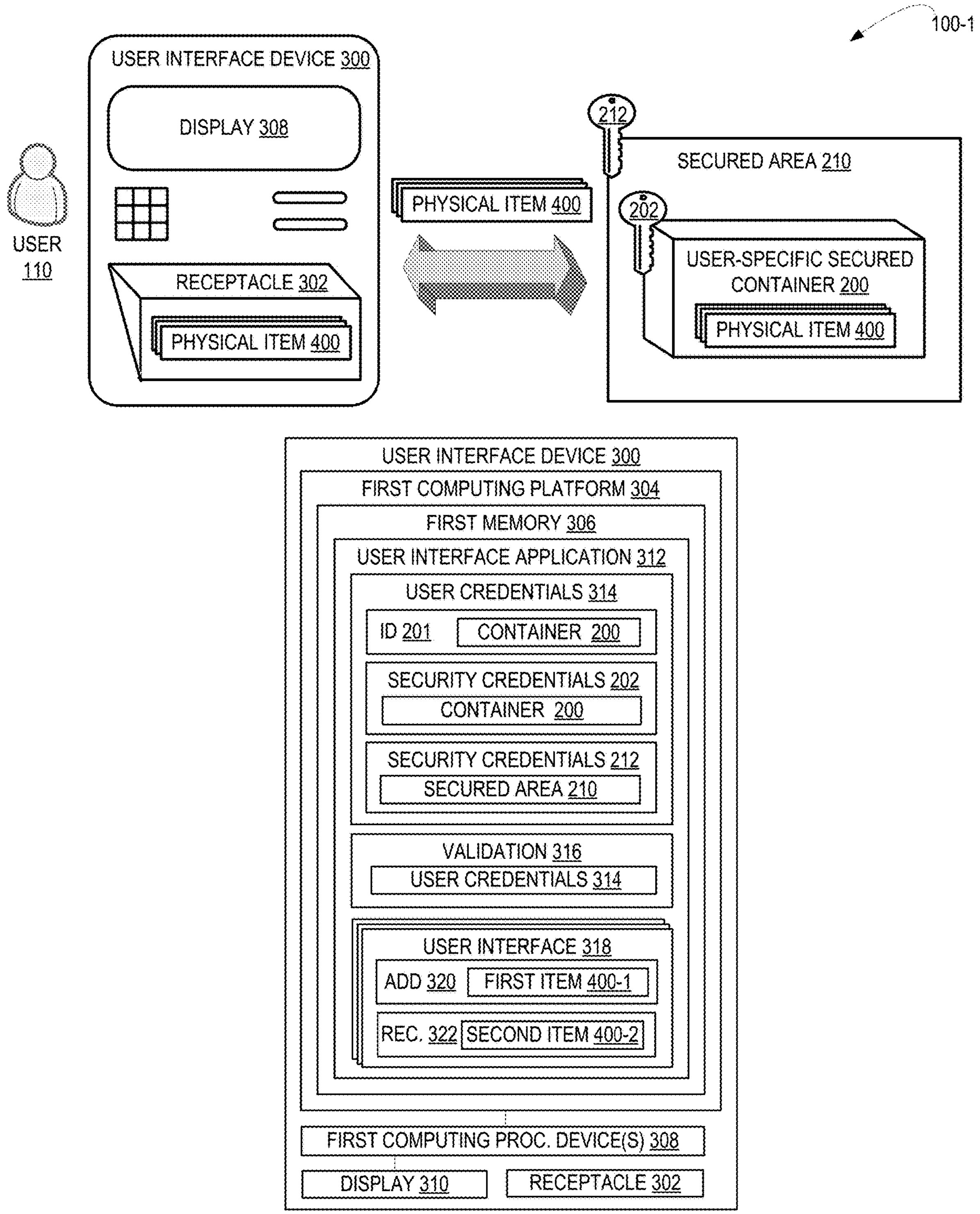
Figure 2:
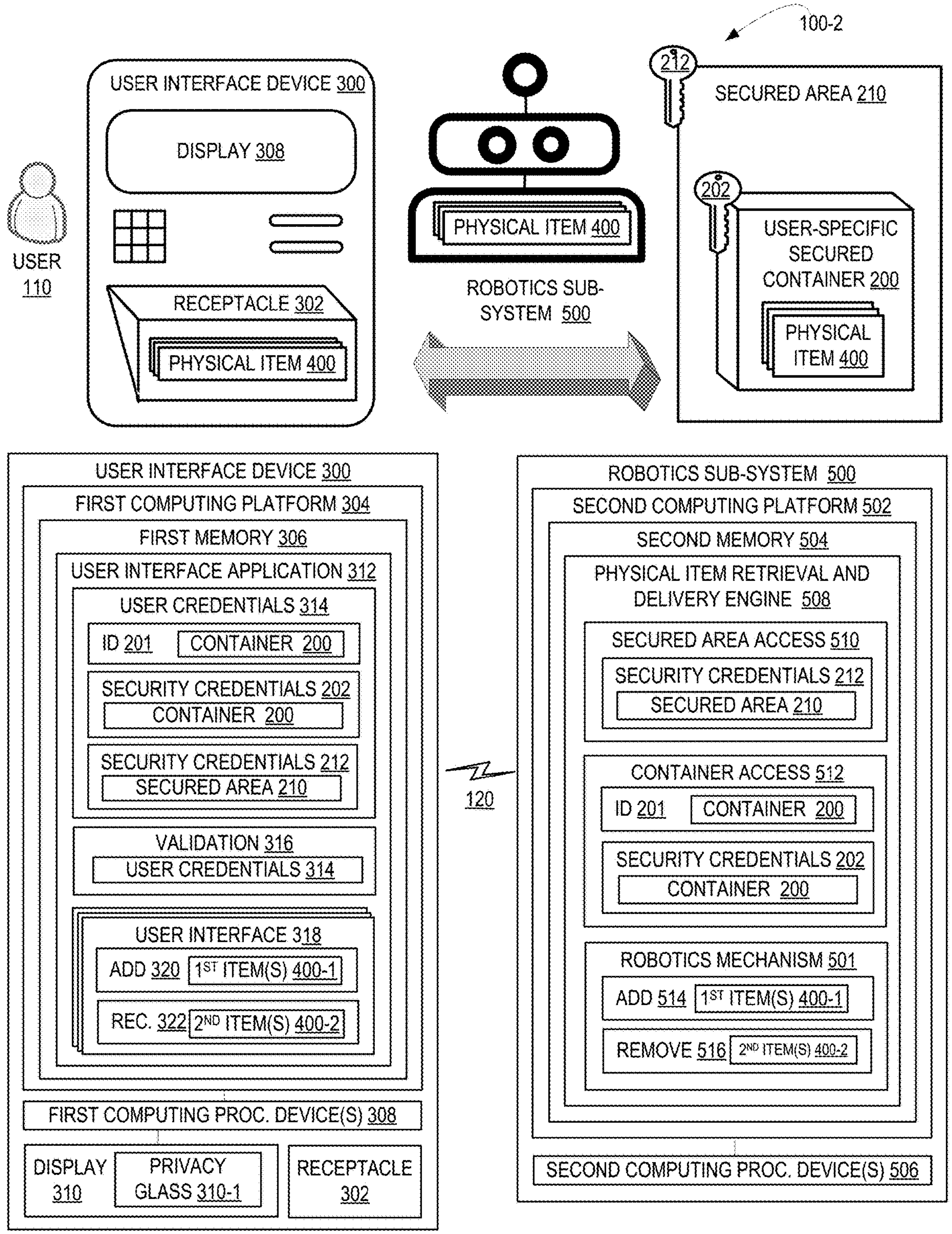
Figure 3:
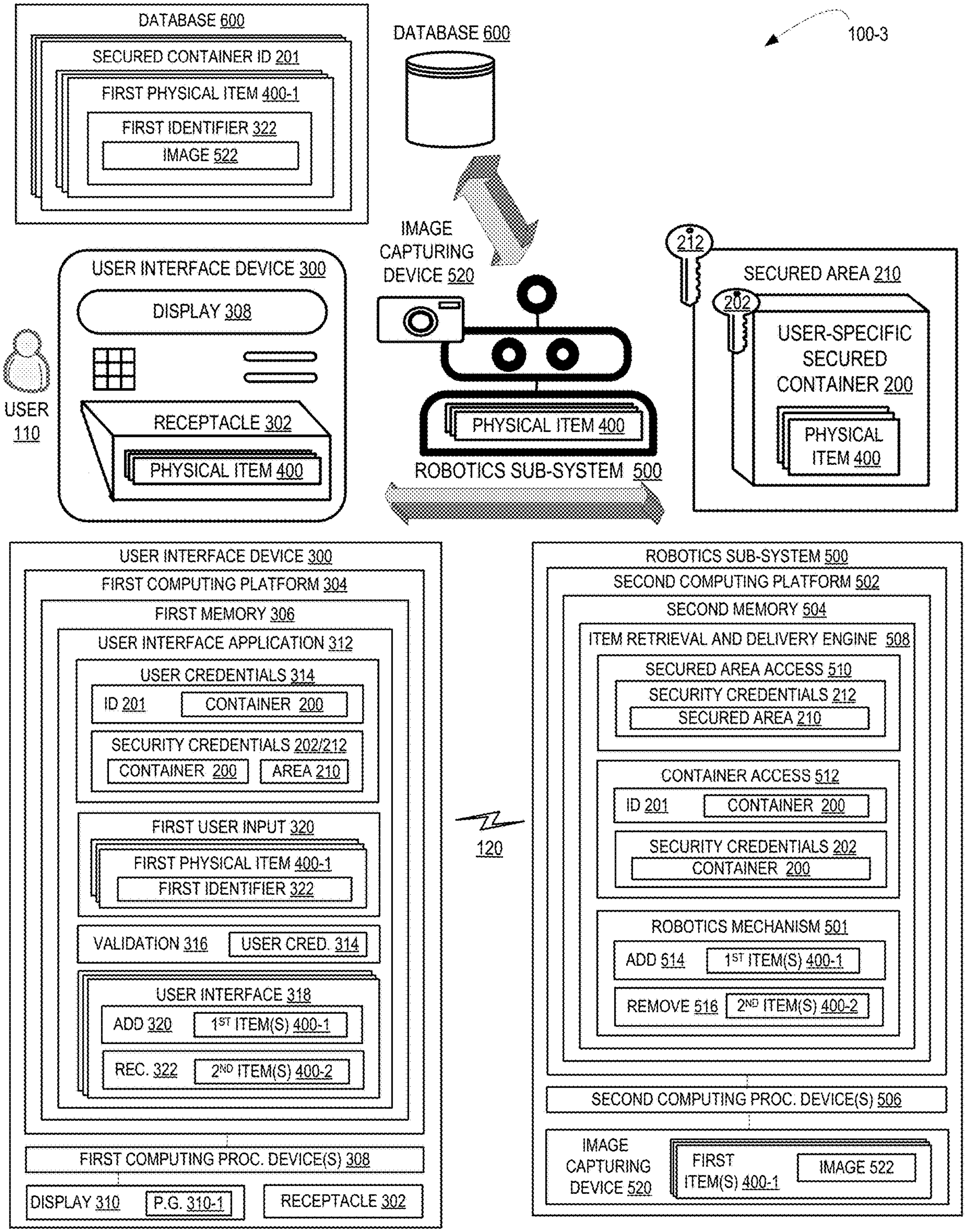
Figure 4:
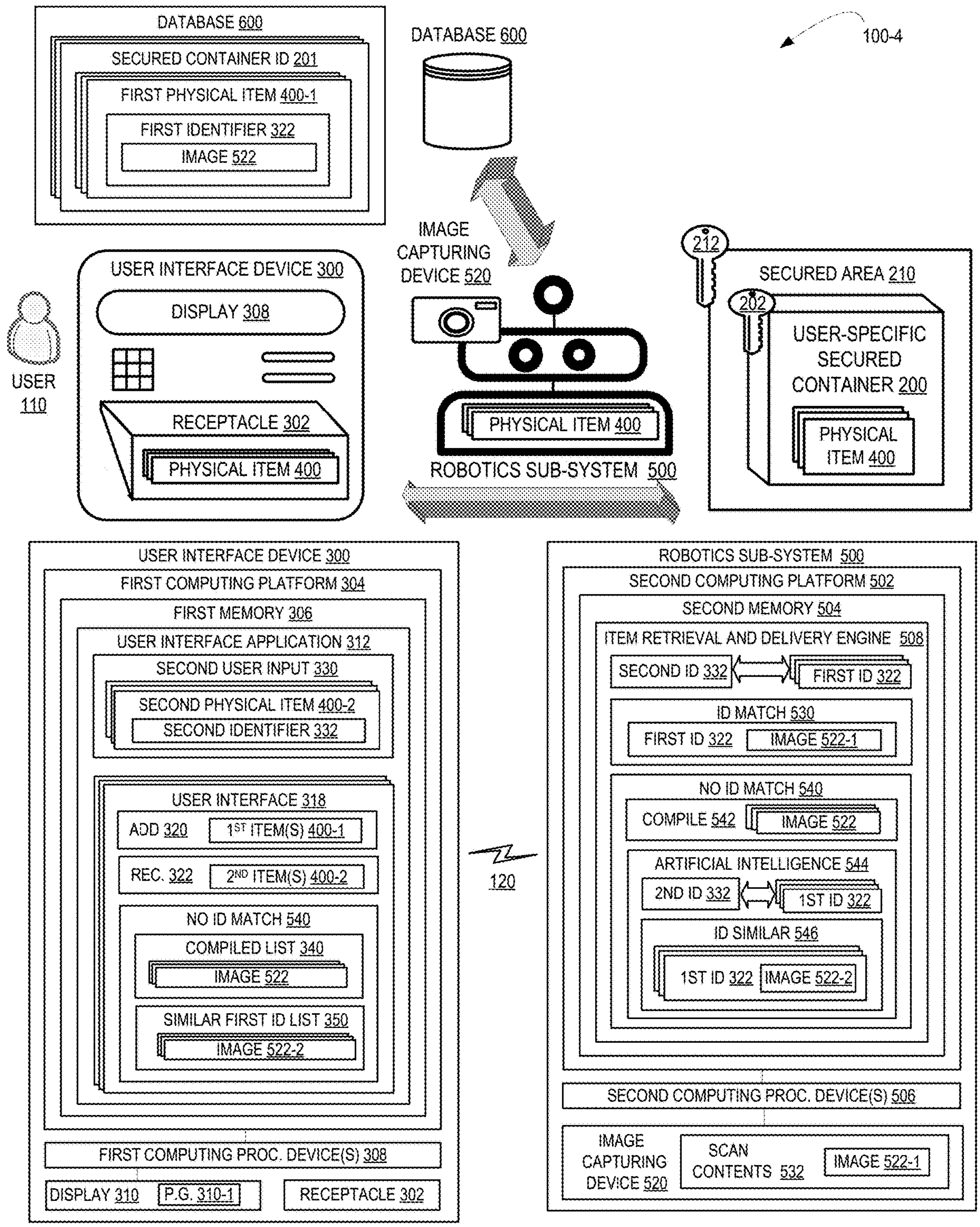
Figure 18:
Figure 19:
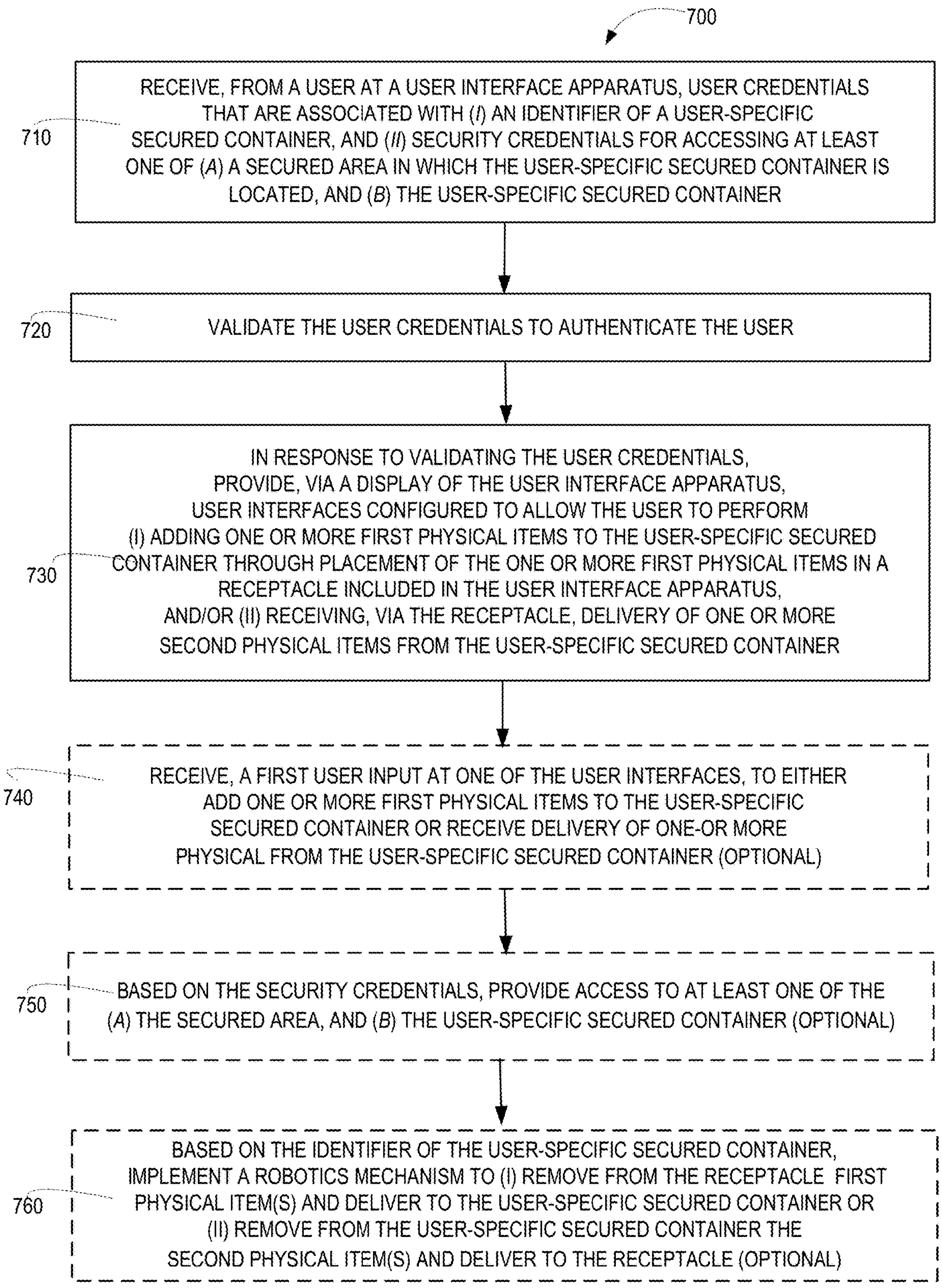

Having thus described embodiments of the disclosure in general terms, reference will now be made to the accompanying drawings, wherein:

FIG. 1 is a schematic/block diagram of a system for remote retrieval and delivery of physical items from/to a user-specific secured container, in accordance with embodiments of the present invention;

FIG. 2 is a schematic/block diagram of an alternate system for providing for remote retrieval and delivery of physical items from/to a user-specific secured container implementing a robotic mechanism for item delivery/retrieval; in accordance with embodiments of the present invention;

FIGS. 3 and 4 are schematic/block diagrams of alternate systems for providing for remote retrieval and delivery of physical items from/to a user-specific secured container implementing a robotic mechanism for item delivery/retrieval and image capturing device for capturing images of items in container for item retrieval purposes; in accordance with embodiments of the present invention;

FIGS. 5-18 are exemplary user interfaces 318 are depicted which are used in the process for retrieving physical items from a user-specific secure container or delivering physical items to the user-specific secure container, in accordance with embodiments of the present invention; and FIG. 19 is a flow diagram of a method for providing for remote retrieval and delivery of physical items from/to a user-specific secured container, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for remote access to secured containers, such as safe deposit boxes or the like. Remote access is made possible by a user interface apparatus, such as an Automated Teller Machine (ATM) or dedicated kiosk device which has an associated receptacle for receiving physical items delivered from and to the remote secured container, such as a safety deposit box.

The user of the remote secured container access system pre-registers, such that presentation of the user credentials at the user interface apparatus provides the user options for receiving items for the secured container and delivering items. Moreover, the user credentials are associated with a secure container identifier (i.e., safety deposit box number) and access credentials for gaining access to the secured area (e.g., vaulted area, warehouse or the like) and/or the secured container.

According to specific embodiments of the present invention, delivery of the physical items to and from the user interface device's receptacle and the secure container is accomplished by a robotic mechanism, which may be guided on a rail system or otherwise an autonomous robotic mechanism that can navigate between the receptacle and the secured container. The robotics mechanism includes an image-capturing device which is used to capture images of physical items as they are delivered to the secure container, to allow for cataloging the physical items according to their images and user assigned identifier/name. In this regard, when a user desires to retrieve a specific item from the secure container, the image capturing device scans the contents of the secure container and image recognition techniques are used to identify the physical item whose image matches the identifier/name of the item as provided by the user.

In specific embodiments of the invention, privacy is provided to the user at the user interface device is provided by a display utilizing privacy glass. Specifically, in response to the user selecting delivery of items to or from the secured container, the privacy glass is invoked to change the transparency or opacity of the display, thereby creating a secure/private region proximate to the user interface apparatus.

Referring to FIG. 1, a schematic/block diagram is presented of a system 100-1 for delivery and retrieval of physical items to and from a user-specific container, in accordance with embodiments of the invention. The system 100-1 includes a user-specific container 200 which is located in a secured area 210 and is configured to store a user's designated physical items 400. In specific embodiments of the invention, the user-specific container 200 is a safe deposit box and the secured area 210 is a vaulted area, such as a financial institution vault or the like. In other embodiments of the invention, the secured area 210 is a secured warehouse and the container is a storage bin or like suitable for storing the user's designated physical items 400.

System 100-1 additionally includes a user interface apparatus 300, which may comprise one or more devices. In this regard, user-interface apparatus 300 includes a receptacle 302 configured to (i) receive first physical items 400-1 from a user 110 for delivery to and storage within the user-specific secured container 200 and (ii) deliver second physical items 400-2 to the user 110 that have been retrieved from the user-specific secured container 200. As used herein the term first physical items 400-1 refers to physical items being delivered to the secured-specific secured container 200, while the term second physical items 400-2 refers to physical items being retrieved from the user-specific secured container 200. Thus, once a first physical item 400-1 is delivered to and stored within the user-specific secured container 200, for purposes of the invention as described herein, the physical item becomes a second physical item 400-2.

In addition, for purposes of ensuring timing delivery and retrieval of physical items 400 from the user-specific container 200, user interface apparatus 300 is physically co-located with the user-specific secured container and, thus, co-located with the secured area 210. For example, the user interface apparatus 300, which in specific embodiments of the invention may comprise an Automated Teller Machine (ATM) or a kiosk specifically designed for physical item retrieval and delivery may be located within the interior or exterior of a financial institution that houses the secured containers 200 (e.g., safe deposit boxes) within a secured area (e.g., financial institution vault or the like). In those embodiments of the invention, in which the user interface apparatus 300 comprises an ATM, the ATM may be retrofitted to include receptacle 302 or specifically designed to include receptacle 302.

Further, user-interface device 300 includes a first computing platform 304 having a first memory 306, one or more first computing processor devices 308 in communication with first memory 306 and a display 308 in communication with at least one of the first computing processor device(s) 308. First memory 306 may comprise volatile and/or non-volatile memory, such as read-only memory (ROM) and/or random-access memory (RAM), EPROM, EEPROM, flash cards, or any memory common to computing platforms. Moreover, first memory 306 may comprise cloud storage, such as provided by a cloud storage service and/or a cloud connection service. First computing processing device(s) 308 may include an application-specific integrated circuit ("ASIC"), or other chipset, logic circuit, or other data processing device. First computing processing device(s) 308 may execute one or more application programming interface (APIs) (not shown in FIG. 1) that interface with any resident programs, such as user interface application 312 or the like, stored in first memory 306 of first computing platform 304 and any external programs. Further, first computing platform 304 may include various processing subsystems (not shown in FIG. 1) embodied in hardware, firmware, software, and combinations thereof, that enable the functionality of first computing platform 304 and the operability of first computing platform 300 on a distributed communication network (not shown in FIG.), such as the Internet, intranet(s), cellular network(s) and the like. For example, processing subsystems allow for initiating and maintaining communications and exchanging data with other networked devices. For the disclosed aspects, processing subsystems of first computing platform 304 may include any subsystem used in conjunction with user interface application 312 and related tools, routines, sub-routines, applications, sub-applications, sub-modules thereof.

User interface application 312 is configured to receive, user credentials 314 (e.g., passcode/personal identification number (PIN), personal data or the like) from a user 110. Since, according to the present invention, the user 110 will have pre-registered for remote delivery/retrieval of physical items 400 from their corresponding user-specific secured container 200, the user credentials 314 are associated with (i) an identifier 201 of the user-specific secured container 200 (e.g., a safe deposit box number or the like) and (ii) security credentials 212, 202 for accessing at least one of (a) the secured area 210 or (b) the user-specific secured container 200. In response to receiving the user credentials 314, user interface application 312 is configured to validate the user credentials 314 to authenticate the user 110 (i.e., ensure that the user is, in fact, who they purport to be).

In response to validating the user credentials 314, user interface application 312 is configured to provide/present, via display 310, user interfaces 318 that are configured to allow the user 110 (i) add 320 one or more first physical items 400-1 to the user-specific secured container 200 by placing the one or more first physical items 400-1 in the receptacle 302, and (ii) receive 322, via the receptacle 302, delivery of one or more second physical items 400-2 from the user-specific secured container 200.

Referring to FIG. 2, a schematic/block diagram is presented of a system 100-2 for delivery and retrieval of physical items to and from a user-specific container implementing a robotic mechanism as the delivery/retrieval means, in accordance with embodiments of the present invention. System 100-2 includes at least some of the features shown and described in relation to FIG. 1 and, as such, those features will not be discussed herein in relation to FIG. 2.

System 100-2 additionally includes robotics sub-system 500 which includes a robotics mechanism 501 configured to retrieve physical items 400-1 from the receptacle 302 and deliver the physical items 400-1 to the user-specific secured container 200 and/or retrieve physical items 400-2 from the specific secured container 200 and deliver the physical items 400-2 to the receptacle 302. The robotics mechanism 501 may be implemented in conjunction with a rail infrastructure (not shown in FIG. 2) or the robotics mechanism 501 may be an autonomous robotic mechanism.

Robotics sub-system 500 includes a second computing platform 502 which is in network communication 120 with the first computing platform 304. Second computing platform 502 includes second memory 504 and one or more second computing processor devices 506 in communication with second memory 504. Second memory 506 stores physical item retrieval and delivery engine 508 that is configured to receive from the first computing platform 304, the identifier 201 of the user-specific secured container 200 and at least one of (a) security credentials 212 of the secured area 210 and/or (b) security credentials 202 of the user-specific secured container 200. Based on the security credentials 212, 202 and the identifier 201, the physical item retrieval and delivery engine 508 is configured, access 510 the secured area 210, and/or access 512 the user-specific secured container 200. In response to accessing the user-specific secured container 200, robotics mechanism 501 is configured to (i) remove from the receptacle 302 one or more first physical items 400-1 and deliver the one or more first physical items 400-1 to the user-specific secured container 200 and (ii) retrieve from the user-specific container 200 one or more second physical items 400-2 and deliver the one or more second physical items 400-2 to the receptacle 302.

In further specific embodiments of the invention, display 310 includes privacy glass 310-1. In such embodiments of the invention, in response to user 110 providing an input at the user interfaces 318 that to perform either (i) adding first physical items 400-1 to the user-specific secured container 200 or (ii) receiving one or more second physical items 400-2 from the user-specific secured container 200, user interface application is configured to change invoke the privacy glass 310-1 to change at least one of the transparency or opacity of the display 310 to generate a security region proximate the user interface apparatus. The security region allows the user 110 to privately perform the necessary remote physical item retrieval and/or delivery actions on the user interfaces 318 displayed on the display 310 without other individuals proximate the display 310 being able to comprehend the actions.

Referring to FIG. 3, a schematic/block diagram is presented of a system 100-3 for delivery and retrieval of physical items to and from a user-specific container implementing a robotic mechanism as the delivery/retrieval means and an image capturing device for capturing images of physical items stored in the container, in accordance with embodiments of the present invention. System 100-3 includes at least some of the features shown and described in relation to FIGS. 1 and 2 and, as such, those features will not be discussed herein in relation to FIG. 3.

In response to user 110 selecting, via user interface(s) (318) to (i) add 320 a first physical item 400-1 to their respective user-specific secured container 200, user interface application 312 is further configured to receive a first user input that defines a first identifier 322 for the first physical item 400-1. First identifier 322 will typically be a name or the description of the first physical item 400-1 that the user can conceivably remember when subsequently retrieving the item from the user-specific secured container 200.

Further, robotics sub-system 500 includes image capturing device 520 that is configured to capture one or more images 522 of the first physical items 400-1 prior to or after placing the item(s) 400-1 in the user-specific secured container 200.

Additionally, system 100-3 includes database 600 that stored the captured images 522 and associates the captured images 522 with the user-assigned first identifier 322 of the corresponding first physical item 400-1 and the corresponding identifier 201 of the user's secured container 200. As discussed in relation to FIG. 4, infra. The information stored in database 600 is used in specific embodiments of the invention to identify second physical items 400-2 requested, by the user 110, for delivery to the receptacle 302 of the user interface device 300. Moreover, database 600 is configured to track when an item 400-2 is removed from the secured container 200, so that the database is always aware of the current inventory of items 400-2 stored in the secure container 200, as well as provide for historical data related to previous inventory of items 400-2 stored in the secure container including dates when the items were received by and removed from the secure container 200.

Referring to FIG. 4, a schematic/block diagram is presented of a system 100-4 for delivery and retrieval of physical items to and from a user-specific container implementing a robotic mechanism as the delivery/retrieval means and using captured images for retrieval of items stored in the container, in accordance with embodiments of the present invention. System 100-4 includes at least some of the features shown and described in relation to FIGS. 1 and 2 and, as such, those features will not be discussed herein in relation to FIG. 4

In response to user 110 selecting, via user interface(s) (318) to (i) receive 322/retrieve a second physical item 400-2 from their respective user-specific secured container 200, user interface application 312 is further configured to receive a second user input that defines a second identifier 332 for the second physical item 400-2 that the user 110 desires to retrieve. Second identifier 322 will typically be a name or the description of the second physical item 400-2 that the user 110 previously may have used as the first identifier 322 to identify the physical item 400-1 at the time the physical item 400-1 was originally placed into the secured container 200.

In such embodiments of the invention, item retrieval and delivery engine 508 is further configured to receive the second identifier 322 and access the database 600 to determine whether the second identifier matches any of the first identifiers 322 associated with the secure container 200 (i.e., associated with the identifier 201/number of the user's secured container 200). If a determination is made of an identifier match 530, the image 522-1 in database 600 corresponding to the first identifier 322 is retrieved. Subsequently, the image capturing device 520 is used to scan the contents of the secured container and image recognition techniques are implemented to identify the physical item in the secured container that matches the retrieved image 522-1. Robotics mechanism 501 is used to remove the second physical item 400-2 that matches the retrieved image 522-1 from the user-specific secured container 200 and transport/deliver the second physical item 400-2 to the receptacle 200.

If a determination is made of no identifier match 540, artificial intelligence 544 may be implemented to determine if the second identifier 332 is similar to any of the first identifiers 322. For example, if the second identifier 332 is "diamond ring" or "ring" and the first identifiers 322 include "grandma's diamond ring" and "user's diamond ring" or, "grandma's ring" and "user's ring", the system does not know which ring the user intends to retrieve. If a determination is made of that the second identifier 332 is similar 546 to one or more of the first identifiers 322, the image(s) 522-2 in database 600 corresponding to the similar first identifier 322 are retrieved. Subsequently, a similar first identifier list 350 is compiled that includes the images 522-2 and is communicated to the user interface application 312 for presentation as a user interface 318. In this regard, the user 110 is able to select which item having a similar identifier/name to the identifier/name they inputted they intend to retrieve from the secure container 200.

In other embodiments of the invention, if a determination is made of no identifier match 540 or when no similar identifiers can be determined, the image(s) 522-3 and, in some instances first identifiers 322 in database 600 corresponding to all the items currently stored in the secure container 200 are retrieved and a list is compiled 542 that includes images and, in some embodiments, the corresponding first identifier 322 of all items 400-2 currently stored in the secured container. Subsequently, the compiled list 340 is communicated to the user interface application 312 for presentation as a user interface 318. In this regard, the user 110 is able to select which item 400 from amongst all of the items 400 currently stored in the secure container they intend to retrieve from the secure container 200.

Figure 5:
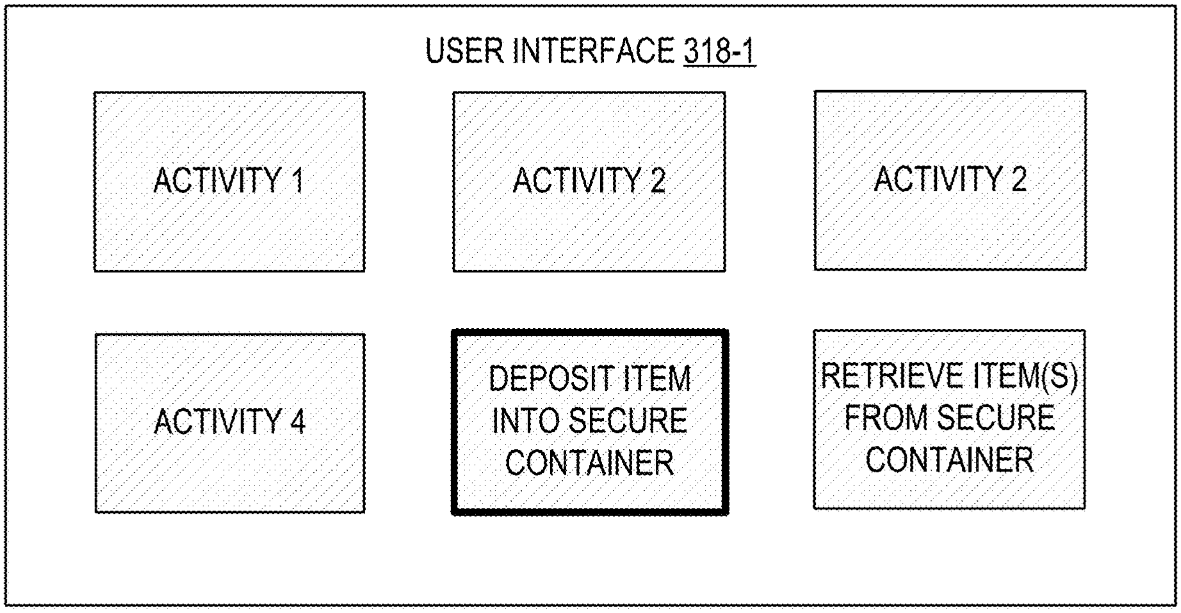

Referring to FIGS. 5-18, exemplary user interfaces 318 are depicted which are used in the process for retrieving items from a secure container or delivering items to the secure container, in accordance with embodiments of the present invention. Referring to FIG. 5, user interface 318-1 depicts an introductory user-interface typically displayed to a user after validating user credentials. User interface 318-1 includes a plurality on activity options including (i) deposit item into secure container and (ii) retrieve item(s) from secure container. In those embodiments of the invention in which the user interface apparatus is an ATM the other activity options (i.e., Activity 1-4) may include withdrawal, deposit, account balance checks and the like. In the illustrated embodiments depicted in FIG. 5, the user has selected the (i) deposit item into secure container activity/option as evident by the heightened border surrounding the deposit item activity/option.

Figure 6:
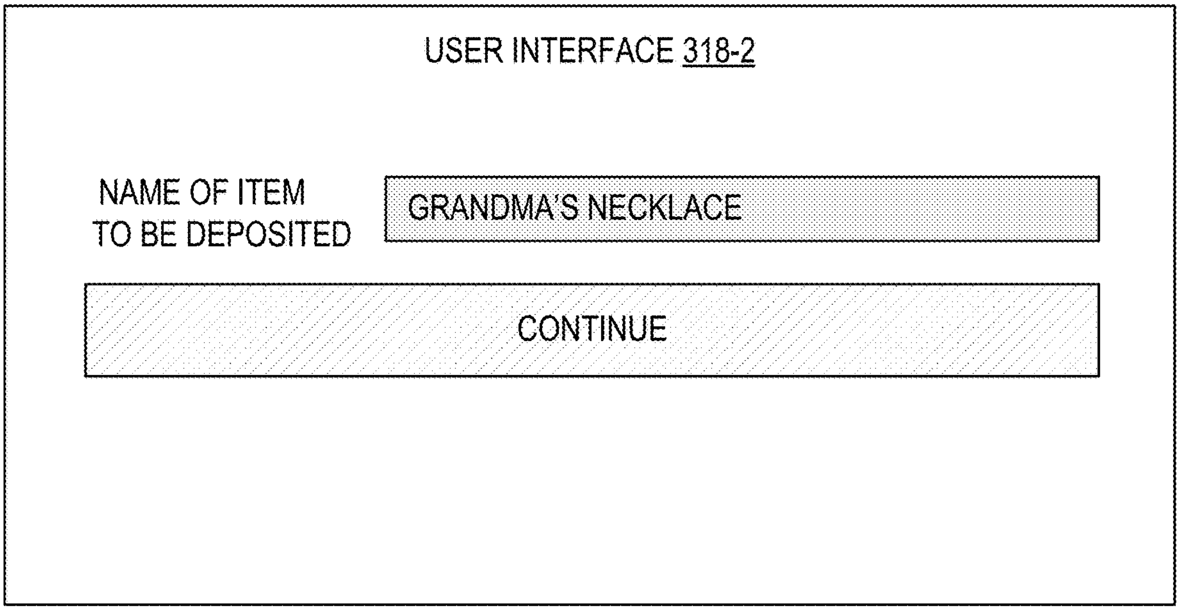
Figure 7:
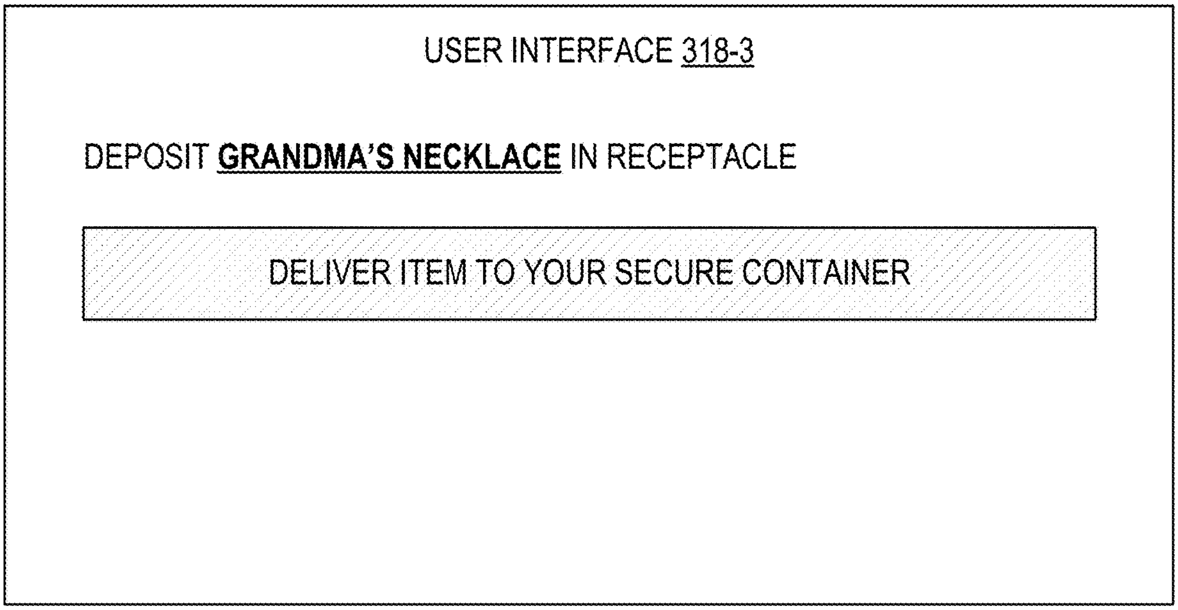
Figure 8:
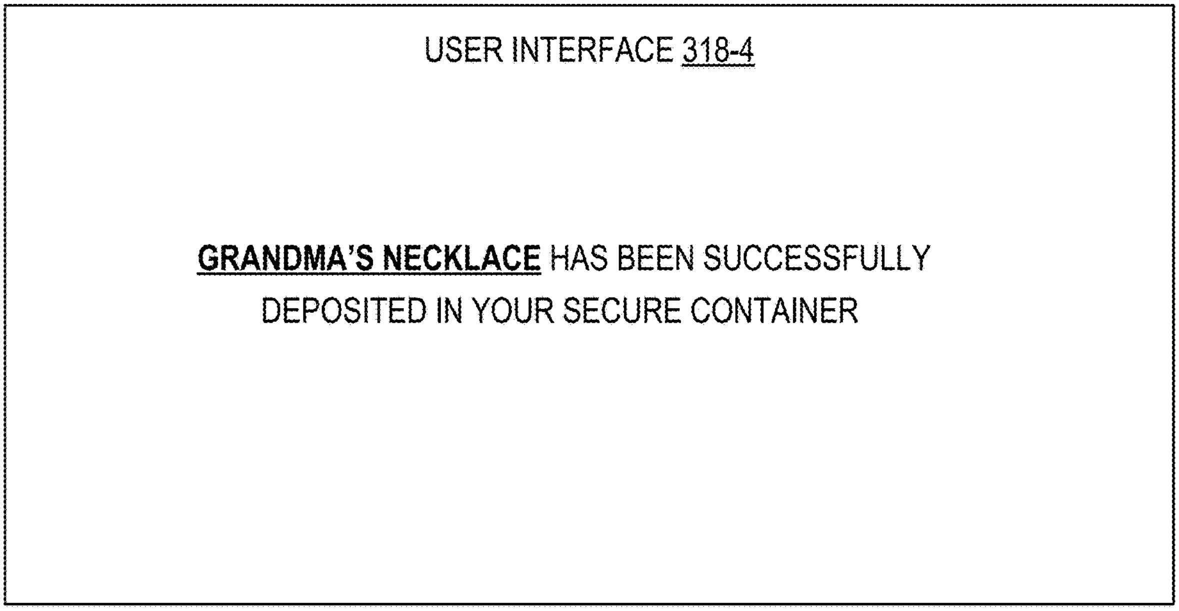

As depicted in FIG. 6, in response to the user selecting the (i) deposit item into secure container activity/option, user interface 318-2 is displayed to the user which requests that the user provide an identifier/name for the physical item being deposited into their user-specific secure container. It should be noted that since the user has pre-registered their secure container, there is no need for the user to identify their secure container (i.e., input their secure container identifier/number or the like). As shown in FIG. 6, the user has inputted the name "grandma's necklace" as the identifier/name of the item to added/deposited to their user-specific secure container. Once a name/identifier has been inputted, the user engages (i.e., taps) the continue button, which results in the presentation of user interface 318-3 depicted in FIG. 7. User interface 318-3 confirms the identifier assigned to the item and requests that the user deposit the item in the receptacle. Engaging the continue button shown in user interface 318-2 (FIG. 6) may trigger unlocking and/or opening of the receptacle for item deposit/entry purposes. In response to depositing the item in the receptacle, the user engages the deliver item button, which, in some embodiments, closes and/or locks the receptacle and initiates delivery of the physical item to the remote user-specific secured container. As depicted in FIG. 8, after a brief period of time, i.e., once the item has been delivered to the user-specific secure container, user-interface 318-4 is displayed to the user acknowledging successful adding/depositing of the physical item into the user's secure container. It should be noted that subsequent user interfaces, not shown here in the figures, may provide for the user to select between receiving, via the user interface apparatus, a printed item delivery receipt, receiving an emailed item delivery receipt or receiving no item delivery receipt.

Figure 9:
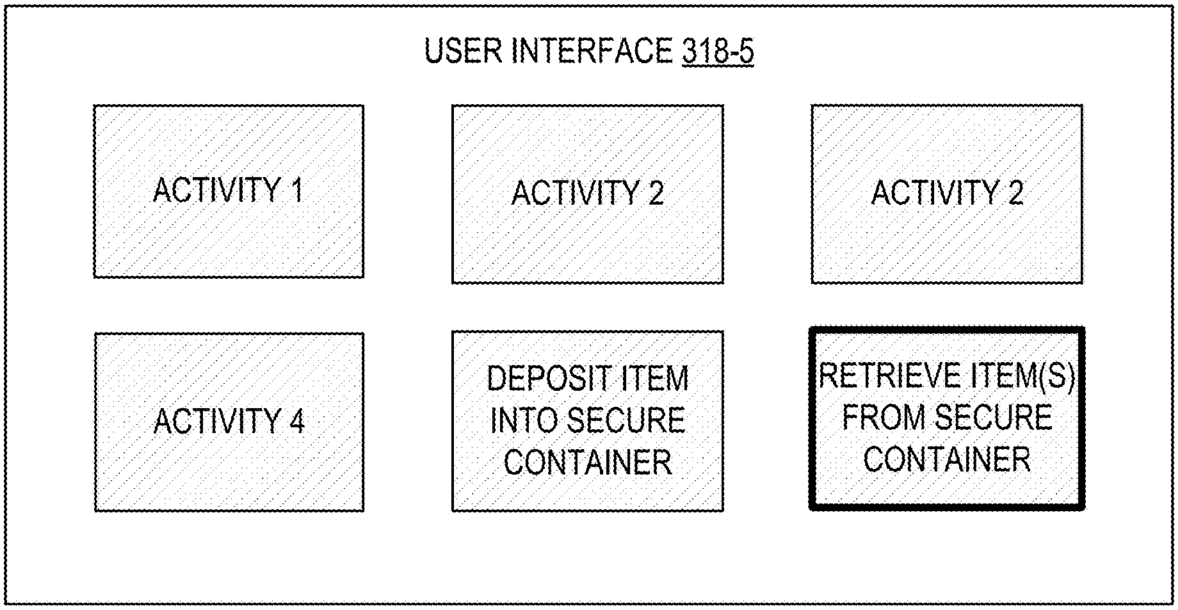

Referring to FIG. 9, the introductory user-interface 318-5 is once again depicted. However, as opposed to the user-interface 318-1 depicted in FIG. 5, in the user-interface

Figure 10:
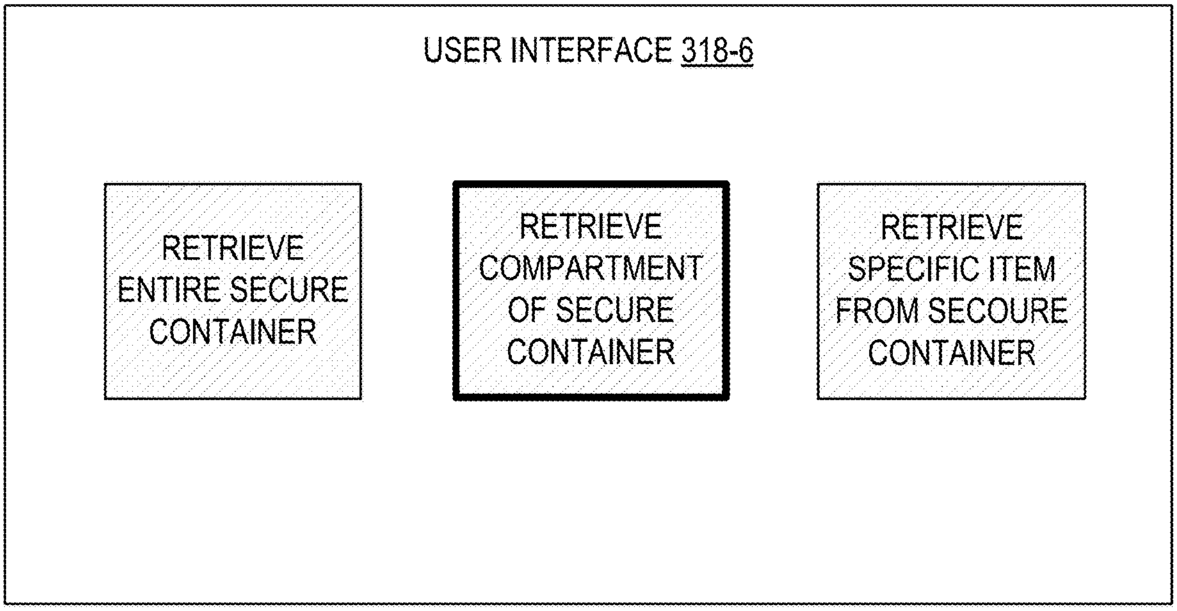
Figure 11:
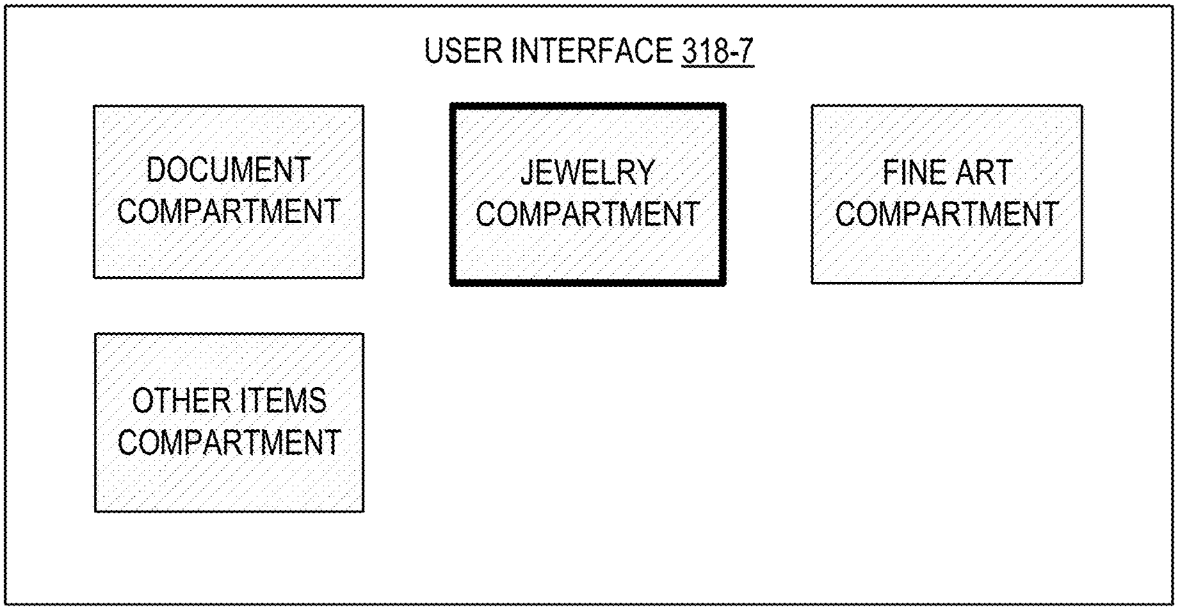
Figure 12:
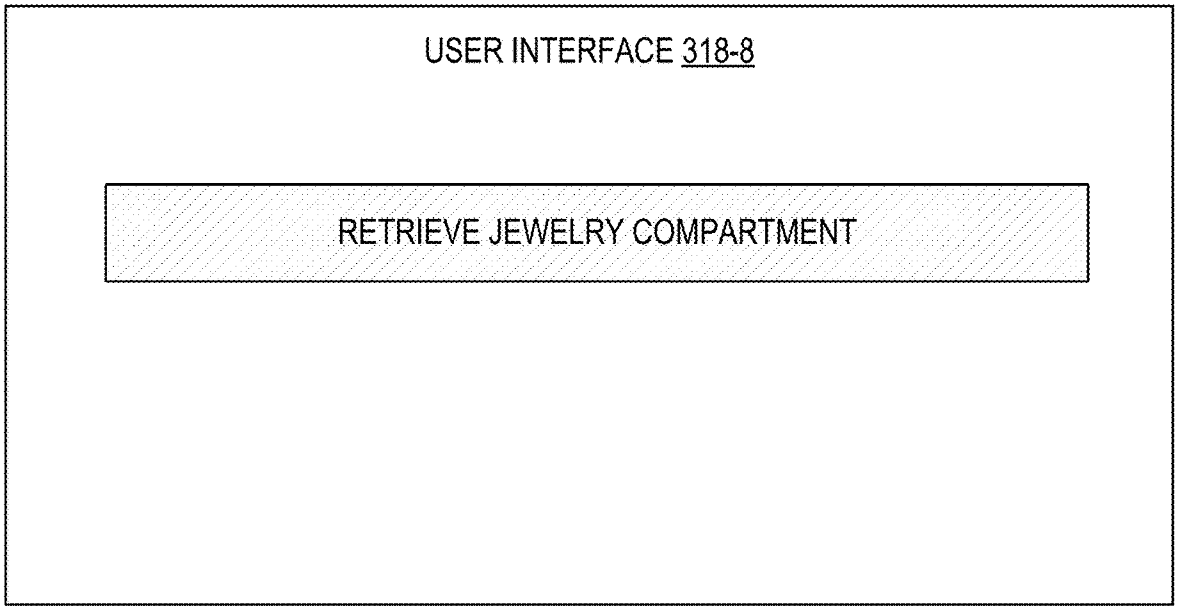

318-5 the user has selected the (i) retrieve item(s) from secure container activity/option as evident by the heightened border surrounding the retrieve item activity/option. Referring to FIG. 10, in response to user selection of the retrieve item(s) activity/option, user interface 318-6 provides various option for retrieving physical items from the user-specific secure container. The options include (i) retrieve entire secure container (or entire contents of the secured container), (ii) retrieve compartment of secure container, and (iii) retrieve a specific item from the secure container. As depicted in the user-interface 318-6 the user has selected the (ii) retrieve compartment of secure container option as evident by the heightened border surrounding the retrieve item option. Such an option is possible in those embodiments of the invention in which the secure container includes individual compartments which physically or virtually segregate the items on the secure container according to the category assigned to the compartment. In response to selecting the retrieve compartment of secure container option, as shown in FIG. 11, user-interface 318-7 is displayed to the user which provides options for retrieving the various compartments of the secure container. In accordance with embodiments of the present invention, the system or the user has designated compartments for document, jewelry, fine art and other items (i.e., a catch-all compartment). As depicted in the user-interface 318-7 the user has selected the jewelry compartment as evident by the heightened border surrounding the retrieve item option. In response to selecting the jewelry compartment, as shown in FIG. 12, a user interface 318-8 is displayed to the user requiring the user to confirm the selection of the jewelry compartment by engaging the retrieve jewelry compartment button. In response to engaging the retrieve jewelry compartment button, the system may retrieve the physical compartment containing jewelry or the contents (i.e., jewelry) physically or virtually contained in the jewelry compartment.

Figure 13:
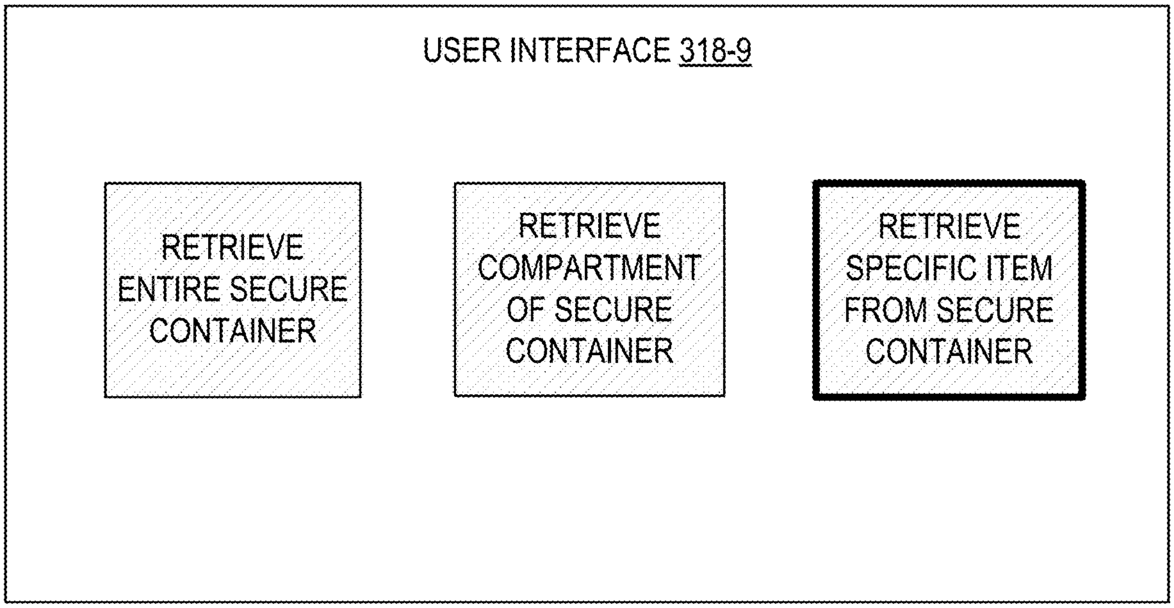
Figure 14:
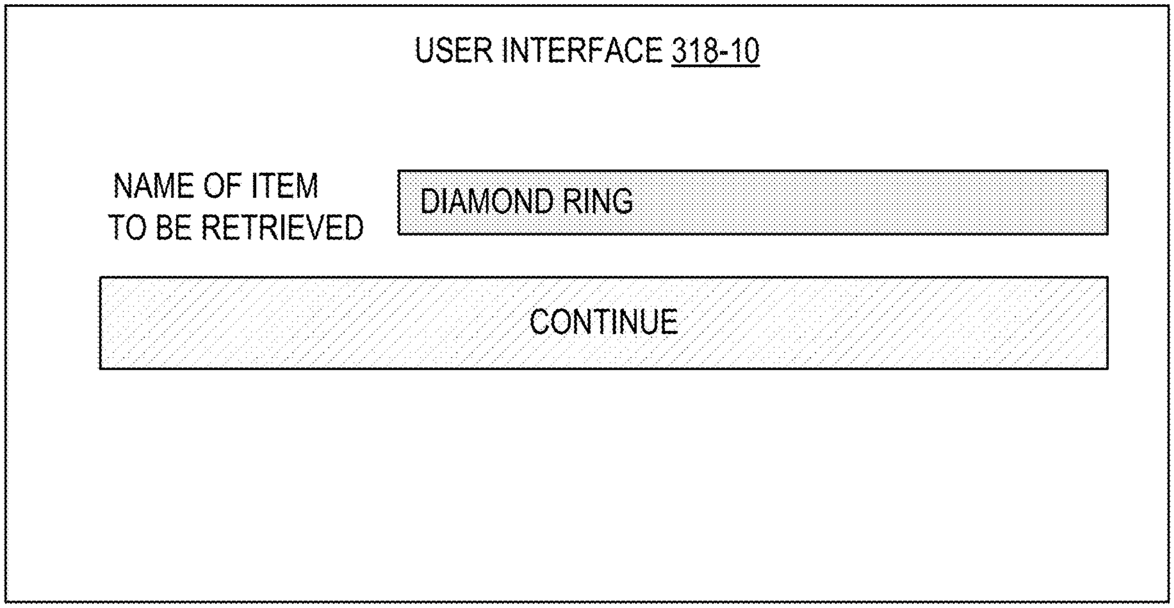
Figure 15:
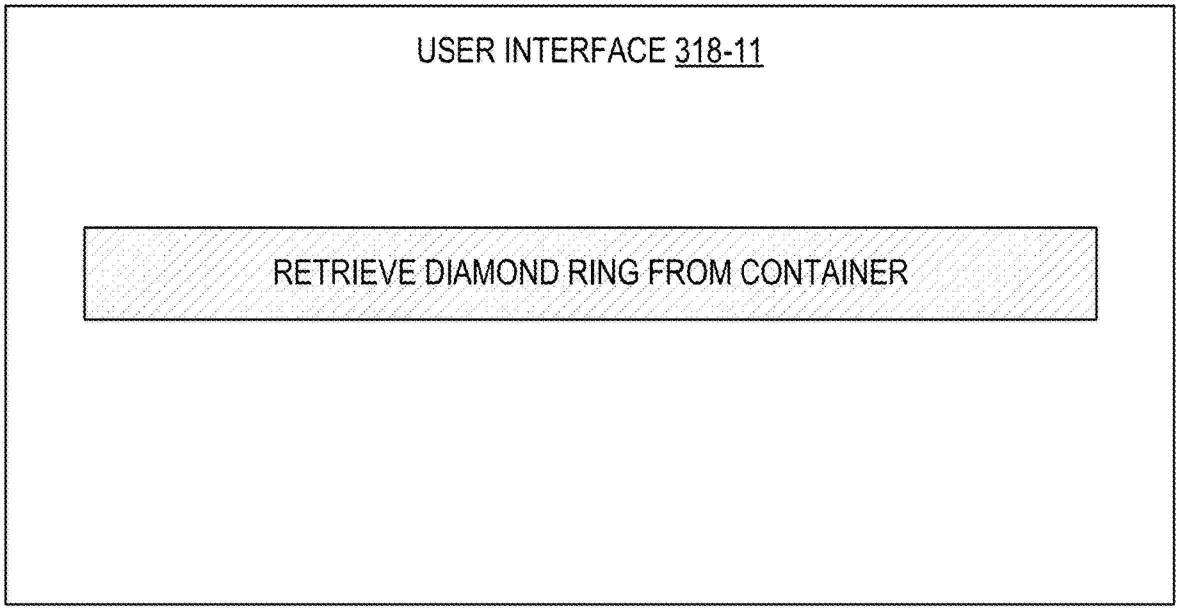
Figure 16:

Referring to FIG. 13, the retrieve item option user-interface 318-9 is once again depicted. However, as opposed to the retrieve item option user-interface 318-6 depicted in FIG. 10, in the user-interface 318-9 the user has selected the (iii) retrieve specific item from secure container option as evident by the heightened border surrounding the retrieve specific item option. Referring to FIG. 14, in response to selecting the (iii) retrieve specific item from secure container option, user interface 318-10 is displayed to the user which requests that the user input the identifier/name of the item to be retrieved from the secure container. In the example shown in user-interface 318-10 the user has inputted the identifier/name "diamond ring". Referring to FIG. 15, once the identifier/name of the item to be retrieved is inputted and the user has engaged the continue button (shown in FIG. 12), user interface 318-11 is displayed to the user requiring the user to confirm the diamond ring selection and initiate the retrieval process via engagement of the retrieve diamond ring from container button. As shown in FIG. 16 once a match is determined between the identifier/name and stored identifier/names associated with items in the container, the item is identified (e.g., via image recognition techniques or the like), retrieved from the container and delivered to the receptacle of the user interface apparatus, user interface 318-12 is displayed which notifies the user the diamond ring has been successfully retrieved from the secure container and that the receptacle may be opened (or in some embodiments automatically opens) so that the item can be obtained by the user.

Figure 17:
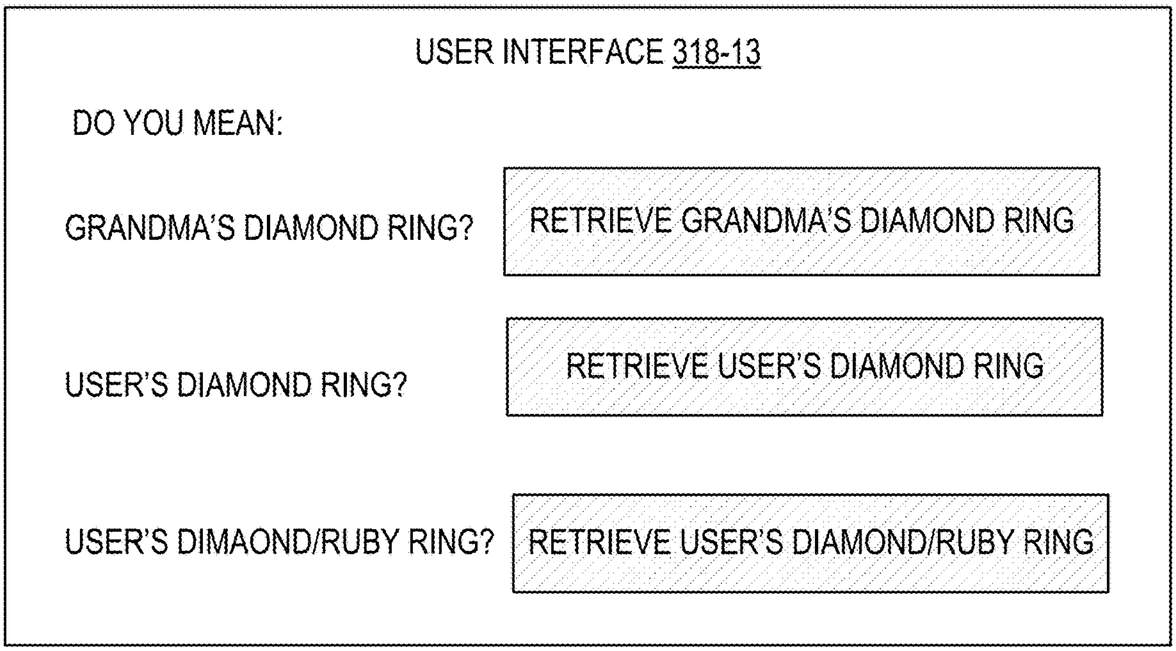

Referring to FIG. 17, user interface 318-13 is presented to the user in response to determining that the name/identifier of the physical desires to retrieve from the secure container does not match any of the names/identifiers associated with the contents of the secure container. As such, the system implemented artificial intelligence/machine learning techniques to determine names/identifiers that are similar to the name/identifier provided by the user. As such, user interface 318-13 includes a list of items in the secured container which have names/identifiers similar to the name/identifier provided by the user. Specifically, by way of example, the user provided the identifier/name "diamond ring" and the system responded with items with similar identifiers/names, specifically "grandma's diamond ring", "user's diamond ring" and "user's diamond/ruby ring". In addition, the list on user interface 318-13 provides options for initiating retrieval of each the item associated with the similarly identified/named item. In additional embodiments of the invention the listing shown in user interface 318-13 may also include an image (not shown in FIG. 17) of the item(s) having similarly identified/named items.

Referring to FIG. 18, user interface 318-14 is presented to the user in response determining that the name/identifier of the physical desires to retrieve from the secure container does not match any of the names/identifiers associated with the contents of the secure container and/or no similar identified/names items exist. In additional embodiments of the invention, user interface 318-14 may be presented to the user initially upon selecting the retrieve specific item option, as shown in user-interface 318-9 of FIG. 13. User interface 318-14 includes a compiled listing of all of the items currently deposited in the secure container, including the name/identifier, an image of the item and buttons/links for initiating retrieval of each the items in the compiled listing. As shown, the listing may be extensive and, as such, the user interface 318-14 may be scrollable. Further, in those embodiments of the invention in which the complied listing of user interface 318-14 is presented in response to not finding a match between the user's desired item and the contents of the secure container, the order in which the items are listed may be determined based on their respective similarity to the item desired by the user.

Referring to FIG. 19, a flow diagram is presented of a method 700 for processing the delivery and retrieval of physical items to and from a remote user-specific container, in accordance with embodiments of the present invention. At Event 710, user credentials are received from a user at a user interface apparatus. The user credentials, which may be a password/passcode, PIN or personal data are associated with (i) an identifier/number of a user-specific secured container, such as a safety deposit box and (ii) security credentials for accessing (a) a secured area at which the secured container is located and/or (b) the secured container itself. In response to receiving the user credentials, at Event 720, the user credentials are validated to authenticate the user.

In response to validating the user credentials, user interfaces are presented on a display of the user interface apparatus that are configured to allow the user to perform (i) adding a physical item to the user-specific container through placement of the object in a receptacle of the user interface apparatus, or (ii) receiving, via the receptacle, delivery of a physical item currently stored in the secured container.

In response to presentation of the user interface, at optional Event 740, a first user input is received at a user interface that selects one of adding a physical item to the user-specific container or receiving delivery of item(s) from the secure container. In response, to the first user input, at optional Event 750, the security credentials are used to provide access to the secured area and/or the user-specific secured container. Further, at optional Event 760, the identifier of the user-specific secured container is used to identify the container and a robotics mechanism is implemented to remove the physical item from the receptacle and deliver the physical item to the remote secured container, or remove the physical item form the remote secured container and deliver the physical item to the receptacle.

Thus, present embodiments of the invention discussed in detail above, provide for remote access to secured containers, such as safe deposit boxes or the like. Remote access is made possible by a user interface apparatus, such as an Automated Teller Machine (ATM) or dedicated kiosk device which has an associated receptacle for receiving physical items delivered from and to the remote secured container, such as a safety deposit box. In specific embodiments of the invention, delivery of the physical items to and from the user interface device's receptacle and the secure container is accomplished by a robotic mechanism, which may be guided on a rail system or otherwise an autonomous robotic mechanism that can navigate between the receptacle and the secured container. The user of the remote secured container access system pre-registers, such that presentation of the user credentials at the user interface apparatus provides the user options for receiving items for the secured container and delivering items. Moreover, the user credentials are associated with a secure container identifier (i.e., safety deposit box number) and access credentials for gaining access to the secured area (e.g., vaulted area, warehouse or the like) and/or the secured container. Thus, presentation of the user credentials provides for identification of the secured container and access to the secured area and/or secured container.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for remote retrieval and insertion of contents from/within user-specific secured containers, the system comprising:

a user-specific secured container physically located in a secured area; and a user interface apparatus including:

a receptacle configured to (i) receive first physical items from a user for storage in the user-specific secured container and (ii) deliver second physical items to the user that have been retrieved from the user-specific secured container, wherein the user-specific secured container is co-located with the user interface apparatus; and a first computing platform including a first memory, one or more first computing device processors in communication with the first memory and a display in communication with at least one of the one or more computing processor devices, wherein the memory stores a user interface application configured to:

receive, from a user, user credentials that are associated with (i) an identifier of the user-specific secured container, and (ii) security credentials for accessing at least one of (a) the secured area and (b) the user-specific secured container, validate the user credentials to authenticate the user, in response to validating the user credentials, provide, via the display, user interfaces configured to allow the user to perform at least one of (i) add one or more first physical items to the user-specific secured container by placing the one or more first physical items in the receptacle, and (ii) receive, via the receptacle, delivery of one or more second physical items from the user-specific secured container, receive a first user input that comprises a first identifier for each of the one or more first physical items being added to the user-specific secure container, a robotics mechanism includes an image capturing device configured to capture one or more images of each of the one or more first physical items to be added to the user-specific secure container, the system further comprises a database that stores the one or more images and catalogs the one or more images according to the first identifier of a corresponding first physical item, and receive a second user input that comprises a second identifier for each of the one or more second physical items being retrieved from the user-specific secure container;

a robotic sub-system including the robotic mechanism and a second computing platform having a second memory and one or more second computing device processors in communication with the second memory, wherein the second memory stores physical item retrieval and delivery engine configured to:

retrieve (a) the at least a portion of the user-specific secured container or (b) the one or more specified second physical items from the user-specific secured container and deliver (a) or (b) to the receptacle, access the database to determine whether at least one of the second identifiers matches one of the first identifiers, in response to determining that at least one of the second identifiers matches one of the first identifiers, instruct the image capturing device to scan the contents of the user-specific secure container and implement image recognition techniques on the scanned contents to identify at least one second physical item based on the scanned contents including the cataloged image associated with the matching first identifier, and retrieve, based on the identifier of the user-specific secured container, the identified at least one second physical item from the user-specific secure container and deliver the identified at least one second physical item to the receptacle.

2. The system of claim 1 further comprising:

the retrieval and delivery engine configured to:

receive (i) the identifier of the user-specific secured container, and (ii) the security credentials, based on the security credentials, provide access to at least one of (a) the secured area, and (b) the user-specific secured container, and based on the identifier of the user-specific secured container, implement the robotics mechanism to remove from the receptacle one or more first physical items and deliver the one or more first physical items to the user-specific secured container.

3. The system of claim 2, wherein the physical item retrieval and delivery engine is further configured to:

receive (iii) user instructions provided by the user interface application to retrieve (a) at least a portion of the user-specific secured container or (b) one or more specified second physical items from the user-specific secured container.

4. The system of claim 3, wherein, the item retrieval and delivery engine is further configured to receive the first identifiers for each of the one or more first physical items.

5. The system of claim 1, wherein, the item retrieval and delivery engine is further configured to, in response to determining that the second identifier does not match one of the first identifiers, compile the captured images of the first physical items stored in the user-specific secure container and communicate the captured images to the user interface application, wherein the user interface application is configured to provide, via the display, one or more user interfaces configured to display the captured images and allow the user to select one or more captured images to initiate the retrieval from the user-specific secure container of the physically items depicted in the selected one or more captured images.

6. The system of claim 1, wherein, the item retrieval and delivery engine is further configured to, in response to determining that the second identifier does not match one of the first identifiers, implement artificial intelligence to determine first identifiers that are similar to the second identifier, compile the captured images associated with said first identifiers and communicate the captured images to the user interface application, wherein the user interface application is configured to provide, via the display, one or more user interfaces configured to display the captured images and allow the user to select one or more captured images to initiate the retrieval from the user-specific secure container of the physically items depicted in the selected one or more captured images.

7. The system of claim 1, wherein the display of the user interface apparatus comprises privacy glass and wherein the user interface application is further configured to:

receiving a user input that indicates a user selection of (i) adding the one or more first physical items to the user-specific secured container, or (ii) receiving delivery of the one or more second physical items from the user-specific secured container, and in response to receiving the user input, implement the privacy glass to change at least one of a transparency or opacity of the display to generate a security region proximate the user interface apparatus.

8. The system of claim 1, wherein the user-specific secured container is safe deposit box and the secured area is a vault including a plurality of safe deposit boxes.

9. The system of claim 1, wherein the secured area is warehouse including a plurality of user-specific secured container.

10. A computer-implemented method for retrieval and insertion of contents from/within user-specific secured containers, method being executable by one or more computing processor devices and comprising:

receiving, from a user at a user interface apparatus, user credentials that are associated with (i) an identifier of a user-specific secured container that is co-located with the user-interface apparatus and (ii) security credentials for accessing at least one of (a) a secured area in which the user-specific secured container is located, and (b) the user-specific secured container;

validating the user credentials to authenticate the user;

in response to validating the user credentials, providing, via a display of the user interface apparatus, user interfaces configured to allow the user to perform at least one of (i) adding one or more first physical items to the user-specific secured container through placement of the one or more first physical items in a receptacle included in the user interface apparatus, and (ii) receiving, via the receptacle, delivery of one or more second physical items from the user-specific secured container;

receiving a first user input that comprises a first identifier for each of the one or more first physical items being added to the user-specific secure container;

capturing one or more images of each of the one or more first physical items to be added to the user-specific secure container;

storing the one or more images and catalogs the one or more images according to the first identifier of a corresponding first physical item;

receiving a second user input that comprises a second identifier for each of the one or more second physical items being retrieved from the user-specific secure container;

retrieving (a) the at least a portion of the user-specific secured container or (b) the one or more specified second physical items from the user-specific secured container and deliver (a) or (b) to the receptacle, via a robotic sub-system including the robotic mechanism and a second computing platform;

accessing the database to determine whether at least one of the second identifiers matches one of the first identifiers;

in response to determining that at least one of the second identifiers matches one of the first identifiers, instruct the image capturing device to scan the contents of the user-specific secure container and implement image recognition techniques on the scanned contents to identify at least one second physical item based on the scanned contents including the cataloged image associated with the matching first identifier; and retrieving, based on the identifier of the user-specific secured container, the identified at least one second physical item from the user-specific secure container and deliver the identified at least one second physical item to the receptacle.

11. The computer-implemented method of claim 10, further comprising:

receiving, a first user input at one of the user interfaces, to add one or more first physical items to the user-specific secured container;

based on the security credentials, providing access to at least one of (a) the secured area, and (b) the user-specific secured container; and based on the identifier of the user-specific secured container, implementing the robotics mechanism to remove from the receptacle one or more first physical items and deliver the one or more first physical items to the user-specific secured container.

12. The computer-implemented method of claim 11, further comprising:

receiving, at the user interface apparatus, a second user input that comprises a first identifier for each of the one or more first physical items being added to the user-specific secure container;

capturing, via an image-capturing device in communication with the robotics mechanism, one or more images of each of the one or more first physical items to be added to the user-specific secure container; and storing the one or more images in a database according to the first identifier of a corresponding first physical item.

13. The computer-implemented method of claim 12, further comprising:

receiving, at the user interface apparatus, user instructions to retrieve (a) at least a portion of the user-specific secured container or (b) one or more specified second physical items from the user-specific secured container;

based on the security credentials, providing access to at least one of (a) the secured area, and (b) the user-specific secured container.

14. The computer-implemented method of claim 13, further comprising:

receiving, at the user interface apparatus, a second user input that comprises a second identifier for each of the one or more second physical items being retrieved from the user-specific secure container;

accessing the database to determine whether at least one of the second identifiers matches one of the first identifiers;

in response to determining that at least one of the second identifiers matches one of the first identifiers, instructing the image capturing device to scan the contents of the user-specific secure container;

implementing image recognition techniques on the scanned contents to identify at least one second physical item based on the scanned contents including the cataloged image associated with the matching first identifier; and retrieving, via the robotics mechanism, the identified at least one second physical item from the user-specific secure container and delivering, via the robotics mechanism, the identified at least one second physical item to the receptacle.

15. A computer program product comprising:

a non-transitory computer-readable medium comprising sets of codes for causing one or more computing devices to:

receive, from a user at a user interface apparatus, user credentials that are associated with (i) an identifier of a user-specific secured container, and (ii) security credentials for accessing at least one of (a) a secured area in which the user-specific secured container is located, and (b) the user-specific secured container;

validate the user credentials to authenticate the user;

in response to validating the user credentials, provide, via the display, user interfaces configured to allow the user to perform at least one of (i) adding one or more first physical items to the user-specific secured container through placement of the one or more first physical items in a receptacle included in the user interface apparatus, and (ii) receiving, via the receptacle, delivery of one or more second physical items from the user-specific secured container;

receive a first user input that comprises a first identifier for each of the one or more first physical items being added to the user-specific secure container;

capture one or more images of each of the one or more first physical items to be added to the user-specific secure container;

store the one or more images and catalogs the one or more images according to the first identifier of a corresponding first physical item;

receive a second user input that comprises a second identifier for each of the one or more second physical items being retrieved from the user-specific secure container;

retrieve (a) the at least a portion of the user-specific secured container or (b) the one or more specified second physical items from the user-specific secured container and deliver (a) or (b) to the receptacle, via a robotic sub-system including the robotic mechanism and a second computing platform;

access the database to determine whether at least one of the second identifiers matches one of the first identifiers;

in response to determining that at least one of the second identifiers matches one of the first identifiers, instruct the image capturing device to scan the contents of the user-specific secure container and implement image recognition techniques on the scanned contents to identify at least one second physical item based on the scanned contents including the cataloged image associated with the matching first identifier; and retrieve, based on the identifier of the user-specific secured container, the identified at least one second physical item from the user-specific secure container and deliver the identified at least one second physical item to the receptacle.

16. The computer program product of claim 15, wherein the sets of codes further cause the one or more computing devices to:

based on the security credentials, provide access to at least one of (a) the secured area, and (b) the user-specific secured container; and based on the identifier of the user-specific secured container, implement the robotics mechanism to remove from the receptacle one or more first physical items and deliver the one or more first physical items to the user-specific secured container.

17. The computer program product of claim 16, wherein the sets of codes further cause the one or more computing devices to:

receive, at the user interface apparatus, a first user input that comprises a first identifier for each of the one or more first physical items being added to the user-specific secure container;

capture, via an image-capturing device in communication with the robotics mechanism, one or more images of each of the one or more first physical items to be added to the user-specific secure container; and store the one or more images in a database according to the first identifier of a corresponding first physical item.

18. The computer program product of claim 17, wherein the sets of codes further cause the one or more computing devices to:

receive, at the user interface apparatus, user instructions to retrieve (a) at least a portion of the user-specific secured container or (b) one or more specified second physical items from the user-specific secured container;

based on the security credentials, provide access to at least one of (a) the secured area, and (b) the user-specific secured container.

* * * * *